(12) United States Patent
Uzun et al.

(10) Patent No.: US 11,010,461 B2
(45) Date of Patent: *May 18, 2021

(54) GENERATING SENSOR-BASED IDENTIFIER

(71) Applicant: VMware, Inc., Palo Alto, CA (US)

(72) Inventors: Erkam Uzun, Atlanta, GA (US); Jungwook Park, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/852,437

(22) Filed: Dec. 22, 2017

(65) Prior Publication Data

US 2019/0197230 A1   Jun. 27, 2019

(51) Int. Cl.
| | |
|---|---|
| *H04L 29/06* | (2006.01) |
| *G06F 21/34* | (2013.01) |
| *G06F 21/44* | (2013.01) |
| *H04W 12/06* | (2021.01) |

(52) U.S. Cl.
CPC ............. *G06F 21/34* (2013.01); *G06F 21/44* (2013.01); *H04L 29/06* (2013.01); *H04L 63/083* (2013.01); *H04L 63/0853* (2013.01); *H04L 63/0861* (2013.01); *H04W 12/06* (2013.01)

(58) Field of Classification Search
CPC .. H04W 12/06; H04L 63/0861; H04L 63/083; H04L 63/0853; H04L 29/06
See application file for complete search history.

(56) References Cited

U.S. PATENT DOCUMENTS

| | | | | |
|---|---|---|---|---|
| 2002/0169608 | A1* | 11/2002 | Tamir | G06K 19/077 704/246 |
| 2011/0289098 | A1* | 11/2011 | Oztaskent | H04N 21/233 707/769 |
| 2014/0172430 | A1* | 6/2014 | Rutherford | G06Q 20/32 704/273 |
| 2015/0373455 | A1* | 12/2015 | Donaldson | G10L 25/87 381/79 |
| 2016/0044151 | A1* | 2/2016 | Shoemaker | H04M 1/7253 455/556.1 |
| 2016/0044429 | A1* | 2/2016 | Moffat | G10L 25/51 381/56 |
| 2016/0105428 | A1 | 4/2016 | Schrempp et al. | |
| 2016/0261582 | A1 | 9/2016 | Lee | |
| 2018/0113675 | A1 | 4/2018 | Rutherford et al. | |

OTHER PUBLICATIONS

Office Action amiled for U.S. Appl. No. 15/852,437.

* cited by examiner

*Primary Examiner* — Alexander Lagor
*Assistant Examiner* — Vu V Tran
(74) *Attorney, Agent, or Firm* — Thomas Horstemeyer, LLP (57) ABSTRACT

Examples of creating a device identifier that are based upon hardware components of a client device are discussed. An inaudible or high frequency reference audio sample is played. Audio capture is initiated using the microphone system. A sensor-based device identifier can be generated from the captured audio due the manufacturing variances in the hardware components used for the speaker and microphone systems.

20 Claims, 8 Drawing Sheets

| Feature | Value |
|---|---|
| Root mean square | 1 |
| Low energy rate | 1 |
| Zero crossing rates | 1 |
| Spectral roll-off | 1 |
| Brightness | 1 |
| Modality | 1 |
| Spectral centroid | 5 |
| Event density | 1 |
| Signal tempo | 1 |
| Pulse clarify | 1 |
| Inharmonicity | 1 |
| Mel-freq. cep. Coef. | 13 |
| Bark spectral distortions | 3 |
| Weighted slope spectral distance | 1 |
| Measuring normalized blocks | 2 |
| Perceptual eval. of speech quality | 2 |
| Itakura-Saito and COSH distance | 2 |
| Cepstral distance | 3 |
| Short-time Four.-Radon trans. Dist. | 1 |
| Spectral phase distortions | 2 |
| Log-likelihood ratio | 1 |
| Log-area ratio | 1 |
| Signal-to-noise ratio | 2 |
| Czenakowski distance | 1 |

GENERATING SENSOR-BASED IDENTIFIER

BACKGROUND

Computing devices, such as smartphones, laptops, personal computers, tablets, or other devices, can be assigned a unique device identifier by an original equipment manufacturer (OEM). As an example, a Unique Device Identifier (UDID) can be used to identify and in some cases authenticate a device. A device identifier can be stored or written into a hardware component of a device that cannot be edited to minimize the risk of a user editing the device identifier. In some cases, the device identifier can be stored in a read-only memory component of a client device. Additionally, the device identifier can utilized to determine whether a particular device is authorized to access a resource. For example, the device identifier, or a token that is generated based upon the device identifier, can be requested by a server from a client device to determine whether to grant access to a particular resource.

The device identifier can be coupled with a password or other credential to authenticate the client device. In some cases, the device identifier can be used as the sole mechanism to authenticate a particular client device. However, device identifiers such as UDID's can be fraught with security issues. A device identifier can be spoofed by an attacker and used to grant access to a resource that the attacker is not otherwise entitled to access. In some computing device operating systems, applications might have access to the device identifier of the device on which the application is executed, which creates an attack vector or point of leakage of the device identifier. Therefore, a more secure identifier that is more difficult to spoof or copy can assist with the security of identifying client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating a sensor-based identifier for a client device that can be used to uniquely identify the device with respect to other devices. Client devices, such as smartphones, tablet computing device, laptops, personal computers, and other devices, can be assigned a unique device identifier by the original equipment manufacturer (OEM) or generated by the operating system installed on the device. The device identifier can be used by the operating system or applications running on the device to uniquely identify the device to other services. For example, the device identifier might be used to identify the device to a remotely executed management service with which the device is enrolled as a managed device. As another example, the device identifier might be used to identify the device to an application marketplace or repository from which the device can obtain applications that are installed on the device. As yet another example, the device identifier can be used to track a device's access or usage of an application or service, which can be useful for generating application analytics or for registering, blacklisting, or whitelisting devices.

While a device identifier might not be used as the sole mechanism to authenticate a user's access to a resource, it can be used as one component of a device authentication or user authentication flow. However, many types of device identifiers that are used can be readily spoofed by an attacker. Spoofing a device identifier can create an attack vector that might allow a malicious user to gain unauthorized access to a resource or pollute device tracking that requires a unique device identifier for various client devices that are being tracked.

Currently, Android Device ID, International Mobile Equipment Identity (IMEI) or Unique Device Identifier (UDID) for iPhones are often used for devices that are running Android™ or iOS®, respectively. Again, a problem with these identifiers is that they may not provide a stable and spoof resistant identification framework. For example, an Android Device ID can be changed after a factory reset IMEI spoofing can be accomplished through various mechanisms that are known in the art. Additionally, UDID has been deprecated on iOS devices. Additionally, other devices on other platforms have different device identifier mechanisms.

Therefore, examples of this disclosure provide a mechanism to create a robust and spoof resistant mechanism for generating a unique device identifier for any device that has one or more sensors or input-output (I/O) devices. In examples of this disclosure, a sensor-based identifier is generated based upon the properties of sensors and/or I/O devices of a client device. Most client devices have some array of sensors, such as a speaker system, a microphone system, one or more cameras, accelerometer, gyroscopes, or light sensors. Because of manufacturing variances and imperfections, each individual sensor can be associated with a unique fingerprint that can be observed on the data that passes through the sensors.

For example, the audio played by the speaker system or recorded by the microphone system can have a unique fingerprint when played on two different examples of the same model of a device. The unique fingerprint can exist because of manufacturing variances or imperfections of the speakers, microphones, processors, interconnects, metal, plastic, or other components that are used in the manufacturing process. Accordingly, this uniqueness affords an opportunity to generate a unique fingerprint, or a sensor-based identifier, for a device that is based on the hardware used in the device itself.

Examples of this disclosure provide a sensor-based identifier that is based upon the speaker system and microphone system. A fingerprinting scheme is employed that uses an ultrasonic or near ultrasonic reference audio sample that is played using the speaker system and captured using the microphone system. The audio sample that is captured by the microphone system is analyzed to generate a fingerprint or sensor-based identifier that uniquely identifies the device. When the device is subsequently authenticated or identified, the device can play the same reference audio sample and generate a captured audio sample using the microphone system from which the sensor-based identifier can be regenerated. In this way, a sensor-based identifier can be employed that is difficult to spoof and is based on the hardware components that are actually used in assembly of the device.

Figure 1:
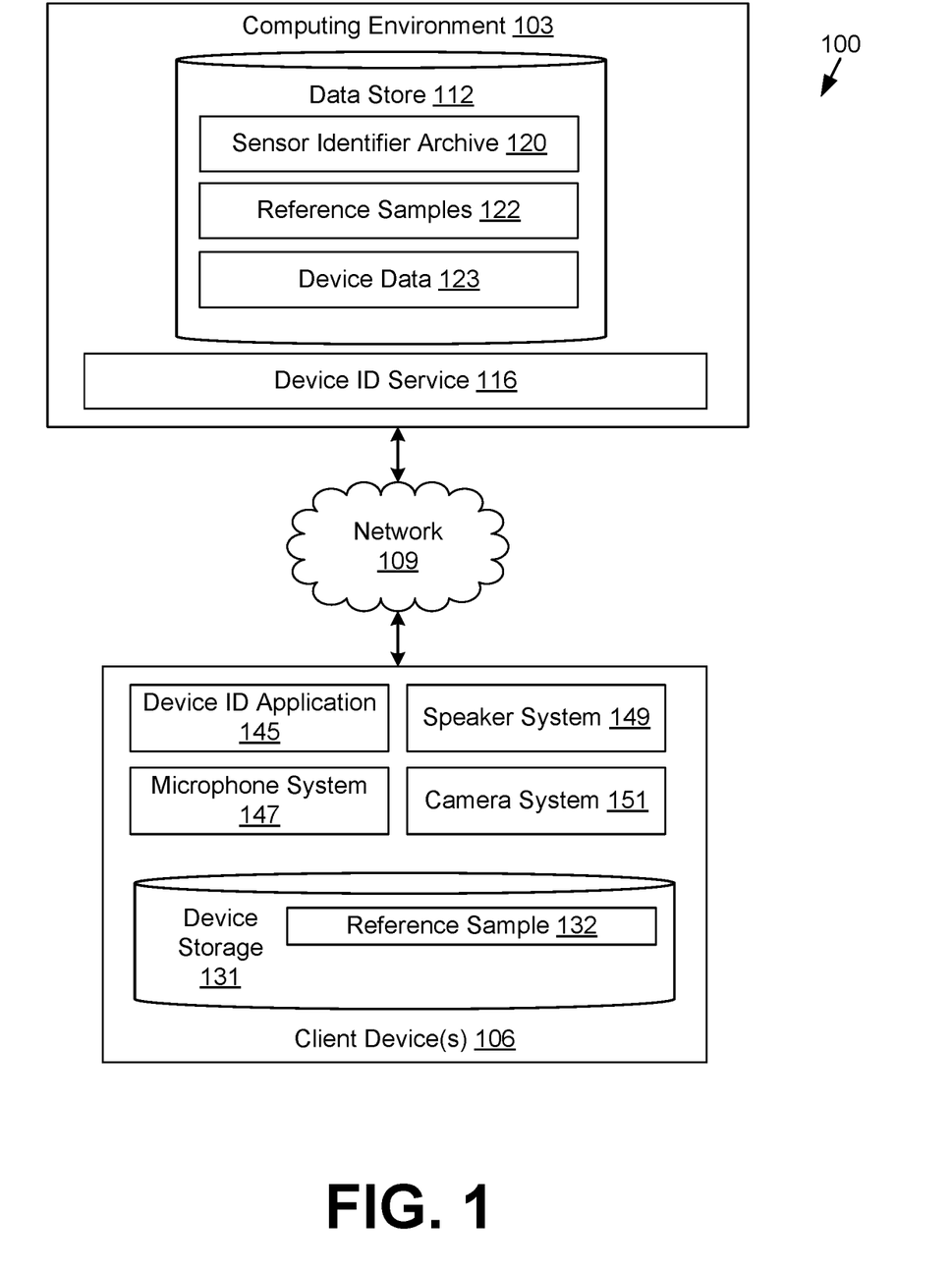
FIG. 1 is a drawing of a networked environment according to various examples of the disclosure.

With reference to FIG. 1, shown is a networked environment 100 according to various examples. The networked environment 100 includes a computing environment 103 and one or more client devices 106 in communication by way of network 109. The network 109 can include, for example, wide area networks (WANs), local area networks (LANs), wired networks, wireless networks, other suitable networks, or any combination of two or more networks. For example, the network 109 can include satellite networks, cable networks, Ethernet networks, and other types of networks.

The computing environment 103 can be a computing environment that is operated by an enterprise, such as a business or other organization. The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted computing environment. The computing environment 103 can be located remotely with respect to the client device 106.

Various applications and/or other functionality can be executed in the computing environment 103. The data store 112 can be representative of a plurality of data stores 112 as can be appreciated. The data stored in the data store 112, for example, is associated with the operation of the various applications and/or functional entities described below.

The components executed on the enterprise computing environment 103 can include a device ID service 116 and other applications, services, processes, systems, engines, or functionality not discussed in detail herein. The device ID service 116 can generate a sensor-based identifier for client devices 106 or authenticate a client device 106 using a sensor-based identifier that is generated from acoustic data associated with one or more I/O components of the client device 106. The device ID service 116 can authenticate a client device 106 based upon other factors, such as usernames, passwords, authentication tokens, two-factor authentication credentials, or other credentials in addition to a sensor-based identifier. Additionally, the device ID service 116 can maintain an archive or database of sensor-based identifiers of client devices 106 in the data store 112.

In some examples, the computing environment 103 can also execute a management service that can monitor and oversee the operation of one or more client devices 106 by administrators. In some examples, the management service can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service.

The management service can include a management console that can allow administrators to manage client devices 106 that are enrolled with the management service. User interfaces can allow an administrator to define policies for a user account or devices associated with an enterprise environment. The user interfaces can also include, for example, presentations of statistics or other information regarding the client devices 106 that can be managed by the management service.

While some examples of this disclosure can be implemented in an environment where client devices 106 are enrolled with a management service as managed devices, other examples can be implemented without a management service in an environment where the device ID service 116 is not executed alongside a management service.

The data stored in the data store 112 can include a sensor identifier archive 120, one or more reference samples 122, device data 123, and potentially other data. A sensor identifier archive 120 represents a table or database where sensor-based identifiers that are associated with client devices 106 are stored or archived. The device ID service 116 can reference the sensor identifier archive 120 to authenticate or identify a client device 106 based upon a sensor-based identifier. The device ID service 116 can also update or augment a previously stored sensor-based identifier in the sensor identifier archive 120 with additional audio sample data or acoustic data captured by a client device 106 for which a previously generated sensor-based identifier is stored in the sensor identifier archive 120.

Sensor-based identifiers can be stored within the sensor identifier archive 120 as an alphanumeric value that is generated from acoustic feature data that is extracted from an audio sample captured by a client device 106. The sensor-based identifier can also be stored as a table or array of acoustic feature data that is extracted from the audio sample. In one scenario, the sensor-based identifier can be stored as plaintext or in an encrypted, hashed, or obfuscated format, which preserves the privacy of the user and/or device from which it was generated. The sensor-based identifier can also be stored along with a confidence score that expresses a confidence level on the quality of the acoustic feature data that was used to generate the sensor-based identifier. The sensor-based identifier can be generated using an algorithm that converts the acoustic feature data extracted from the audio sample into an identifier that is unique with respect to other identifiers. The algorithm can be configured to ensure that no two sets of varying acoustic feature data generate the same identifier. The algorithm can also be configured such that two different sets of acoustic feature data extracted from two audio samples generated by the same device result in the same identifier. Creation of a sensor-based identifier is discussed in further detail below.

Reference samples 123 as reference audio samples, video samples, or sample images from which a sensor-based identifier can be generated. A reference audio sample can be an ultrasonic or near ultrasonic tone or sample that can be played back by the client device 106 and captured using the microphone of the client device. A reference audio sample can be an audio sample that is completely or largely inaudible. In one example, the reference audio sample can be a constant tone at a particular frequency. In another example, a reference audio sample can be a tone or noise of a varying frequency or pitch. In some cases, a reference audio sample can be uniquely generated by or for a particular client device 106 to reduce the possibility of collisions between sensor-based identifiers that are generated by various client devices 106. Another benefit of creating a randomized or unique reference signal can be suppressing high frequency background noises, as some environments could naturally create high frequency background noise.

Device data 123 can include device records corresponding to client devices 106 that for which a sensor-based identifier is stored in the sensor identifier archive 120. Device data 123 can also include information about might be enrolled as managed devices with a management service. The device record can include information about the device such as an OEM, an operating system, or a reference to a particular reference sample 122 that should be used to generate the sensor-based identifier corresponding to the client device 106.

A device record within device data 123 can also include various security settings selected for enforcement on a client device 106 that is enrolled with a management service. Accordingly, a device record can include a device identifier associated with a device, such as the client device 106, one or more device certificates, and a compliance status. In some examples, device data 123 can also identify a user associated with a particular client device 106. A device record can also store other device specific information, such as a device type, operating system type or version, applications that are required or optional for the device, or an enrollment status of the device. In this scenario, the device data can also indicate whether a managed device is a computing device or a peripheral device, such as a printer, scanner, or other device that can be deployed in an environment and associated with a record in a directory service.

Various compliance rules can be enforced by the management service by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 have device encryption enabled, where data stored on the device is stored in an encrypted form. A compliance rule can also specify that the client device 106 is enrolled with the management service as a managed device. Another compliance rule can specify that the user is required to accept the terms of service that are presented by the management component on the client device 106. As another example, a compliance rule can specify that the management component is required to periodically communicate or "check-in" with the management service to report on its status. If a threshold amount of time has elapsed since the previous check-in of the client device 106, the device can be considered to have violated this compliance rule.

Another compliance rule can specify that a client device 106 run one of a specified variant or version of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system.

The client device 106 can execute an operating system, such as WINDOWS, IOS, or ANDROID, and has a network interface in order to communicate with the network 109. The client device 106 has a device storage 131 with various data, including application data, operating system data, application data, and other data. In the context of this disclosure, the device storage 131 can house a reference sample 132 that can be used to generate a sensor-based identifier corresponding to the client device 106. In some examples, the device ID application 145 can also generate a reference sample 132 dynamically.

The client device 106 can execute a device ID application 145 that can facilitate creation of a sensor-based identifier and subsequent identification or authentication of the client device 106 using the sensor-based identifier. The device ID application 145 can also communicate with the device ID service 116 for various purposes. The device ID application 145 can obtain an audio sample based upon playback of the reference sample 132 so that a sensor-based identifier can be generated. In some cases, the device ID application 145 can generate its own sensor-based identifier from the reference sample 132. In other implementations, the device ID application 116 can obtain an audio sample based upon the reference sample 132 and provide the audio sample to the device ID service 116, which can generate the sensor-based identifier on behalf of the client device 106.

The device ID application 145 can be implemented as a portion of a management component that is installed on the client device 106 to carry out local management of the client device 106. In other implementations, the device ID application 145 can be implemented as a portion of the operating system of the client device 106 or as a standalone application.

In the event that the client device 106 is a device that is managed by a management service, the management service can create a device record for the client device 106 within the device data 123 and store it in the data store 112. The device record can include data related to the management of the client device 106 by the management service. For example, the device record can include one or more of: data describing the identity, type and components of the client device 106; the state of the client device 106; organizational groups to which the client device 106 belongs; compliance rules with which the client device 106 must comply; management policies that specify if, when and how the client device 106 is permitted to function; and a command queue associated with the client device 106.

For example, data describing the identity, type and components of the client device 106 can specify at least one of more of: a unique identifier associated with the client device 106 (e.g., identifier issued by a manufacturer of the client device or the management service), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera 151, touchscreen, keyboard, mouse, printer). More particularly, a device record associated with a client device 106 comprising a network connection television can specify that the client device 106 is a device type of television can specify that the client device 106 has a wireless network interface and that the client device 106 has an active connection to the Internet.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service, whether the client device 106 is in a state of compliance with any applicable compliance rules, and whether any remedial actions have been (or are to be) taken as a result of a noncompliance with any applicable compliance rules.

Next, data describing compliance rules with which the client device 106 must comply can, for instance, specify one or more remedial actions that should be performed in the event that an associated rule condition occurs, as described later herein. Further, data describing management policies can include permissions of the client device 106 (e.g., access rights) and settings that are being enforced upon the client device 106 (to control if, when and how the client device 106 is permitted to function).

Finally, the device record can include data describing a command queue associated with the client device 106. For example, the management service can maintain a command queue of commands that are designated for execution against the client device 106. As described herein, a client device 106 can be provisioned by the management service by causing resources to be installed or stored on the client device 106. To implement such a process, the management service can store a command related to provisioning in the command queue. Additionally, the management service can store a command related to a remedial action associated with a compliance rule in the command queue in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Figure 2:
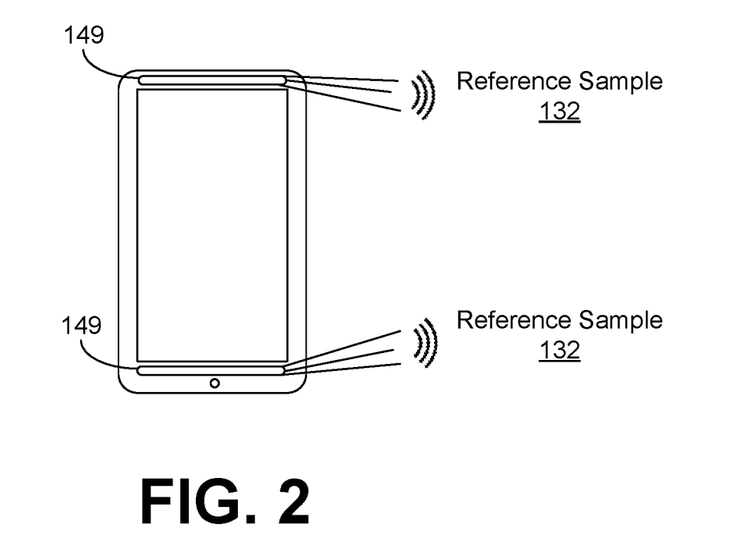
FIG. 2 is a drawing of a client device according to various examples of the disclosure.

Regardless of whether the client device 106 is managed or unmanaged, the device ID application 145 can facilitate creation of a sensor-based identifier that uniquely identifies the client device 106 with respect to other client devices. Reference is now made to FIG. 2, which begins illustration of how the sensor-based identifier can be generated by the device ID application 145. In the scenario shown in FIG. 2, the device ID application 145 can cause the reference sample 132 to be played by the speaker system 149 of the client device 106. The speaker system 149 of the client device 106 can comprise one or more speakers integrated within or accessible to the client device 106.

The device ID application 145 can play the reference sample 132 in response to a command or request from the device ID service 116 to generate a sensor-based identifier. In one example, the command or request can be received in response to a request to access a resource that the device ID service 116 requires authentication or identification of the client device 106. In another example, the command or request can be received in response to a request to enroll the client device 106 as a managed device with a management service. The reference sample 132 can be obtained from the device ID service 116, which can select a particular reference sample 132 that is the same for all device or unique to the client device 106 or a grouping associated with the client device 106. In another example, the device ID application 145 can play the reference sample 132 during an initial setup process of the client device 106 or whenever the user wishes to generate a sensor-based identifier.

The reference sample 132 can comprise an ultrasonic, a near ultrasonic, or an inaudible (to humans) tone or series of tones. An ultrasonic or near ultrasonic reference sample 132 can be used so that the reference sample 132 is relatively inaudible to the user. In one example, a tone or series of tones in the range of about 18-22 kHz can be employed as a reference sample 132. In other examples, a tone or series of tones that are greater than 22 kHz can be used. In any scenario, the reference sample 132 can be a tone or series of tones in a frequency range that is capable of being captured by the microphone system of the client device 106. The reference sample 132 can be played through the speaker system 149 for a predetermined amount of time.

Figure 3:
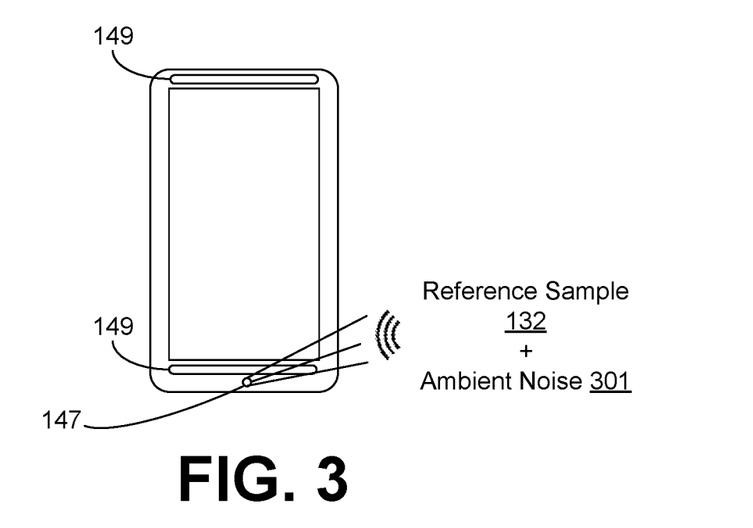
FIG. 3 is a drawing of a client device according to various examples of the disclosure.

Referring next to FIG. 3, as the device ID application 145 is causing the reference sample 132 to be played using the speaker system 149, the device ID application 145 can also capture an audio sample using the microphone system 147 of the client device 106. The microphone system 147 can comprise one or more microphones integrated within or accessible to the client device 106 that can be used to capture audio.

The audio sample includes the reference sample 132 as well as ambient noise 301. In some implementations, the device ID application 145 can cease playing the reference sample 132 for a period of time and capture only ambient noise 301 to facilitate noise cancellation. In some implementations, the device ID application 145 can also adjust the volume of playback of the reference sample 132 depending upon the level of ambient noise 301 detected by the microphone system 147. For example, if ambient noise 301 is relatively low, the reference sample 132 can be played at a low volume. If ambient noise 301 is relatively high, the volume of the playback of the reference sample 132 can be increased to improve the quality of the reference sample 132 that is captured in the audio sample.

Accordingly, upon capture or creation of the audio sample that includes the reference sample 132 and ambient noise 301, the device ID application 145 can generate a sensor-based identifier or provide the audio sample to the device ID service 116, which can generate the sensor-based identifier on behalf of the client device 106. As noted above, the sensor-based identifier can be generated based on acoustic features that can be extracted from the audio sample captured by the client device 106.

Before generating the sensor-based identifier, however, the device ID application 145 or device ID service 116 can perform noise cancellation or noise suppression to remove the ambient noise 301, or substantially all of the ambient noise 301, from the captured audio sample. A noise suppression algorithm can be conducted on the audio sample to remove the ambient or background noise from the audio sample and substantially isolated the reference sample 132. Accordingly, the data that remains in the audio sample after noise suppression reflects the reference sample 132 as played by the speaker system 149 hardware components and captured by the microphone system 147 components. Because the hardware imperfections and variances are considered to be unique to the particular client device 106 in which they are installed, the audio sample can be used to generate a unique sensor-based identifier for the client device 106.

Figure 4:
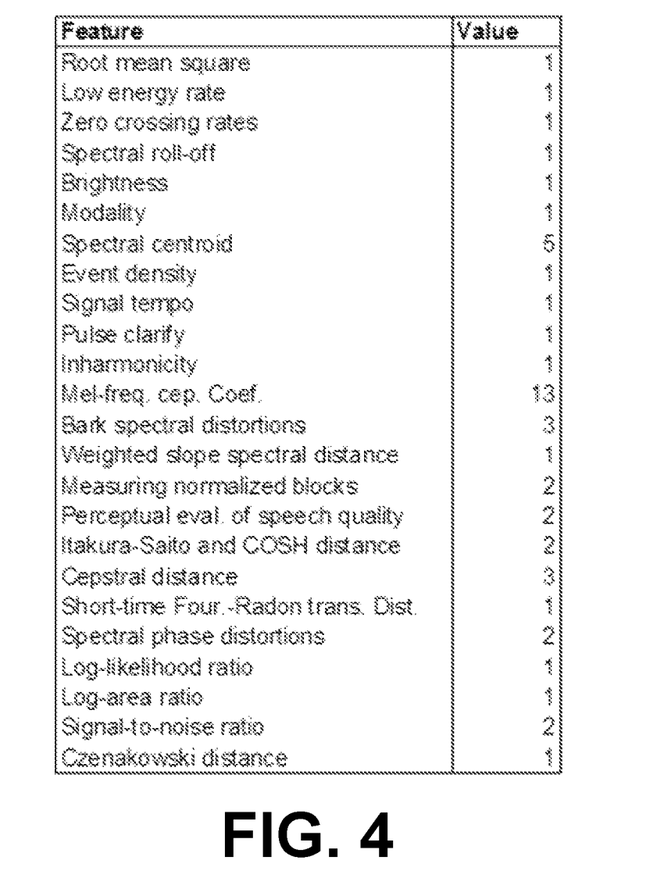
FIG. 4 is a drawing of example acoustic features that can be used to generate a sensor-based identifier according to various examples of the disclosure.

Referring next to FIG. 4, shown is an example of acoustic feature data that can be extracted from the noise suppressed audio sample to form the basis of a sensor-based identifier. The acoustic feature data can represent algorithms or functions that can be applied to the audio sample to extract certain data values that characterize the audio played by the speaker system 149 and captured by the microphone system 147. A value for each of the acoustic features can be used to generate a fingerprint that uniquely identifies the client device 106. The fingerprint can be an alphanumeric identifier that is generated from the some or all of the acoustic feature values, such as through a hash function that reduces an array to an alphanumeric value. Alternatively, the fingerprint can be an array of values that correspond to the extracted acoustic features.

In the example shown in FIG. 4, the acoustic features extracted from the audio sample can include, but are not limited to, a Root mean square, Low energy rate, Zero crossing rates, Spectral roll-off, Brightness, Modality, Spectral centroid, Event density, Signal tempo, Pulse clarify, Inharmonicity, Mel-freq. cep. Coef., Bark spectral distortions, Weighted slope spectral distance, Measuring normalized blocks, Perceptual evaluation of speech quality, Itakura-Saito and COSH distance, Cepstral distance, Short-time Four.-Radon trans. Dist., Spectral phase distortions, Log-likelihood ratio, Log-area ratio, Signal-to-noise ratio, or Czenakowski distance.

The sensor-based identifier can be calculated based upon multiple samples or multiple arrays of acoustic feature data that are extracted from various samples taken from the audio sample captured by the microphone system 147. For example, assuming that the audio sample is five seconds in length, acoustic feature data can be captured every second, and the sensor-based identifier generated based on five arrays of acoustic feature data. In another example, the values of the acoustic feature data from multiple samples can be averaged together and the sensor-based identifier generated based upon the average acoustic feature data values.

Figure 5:
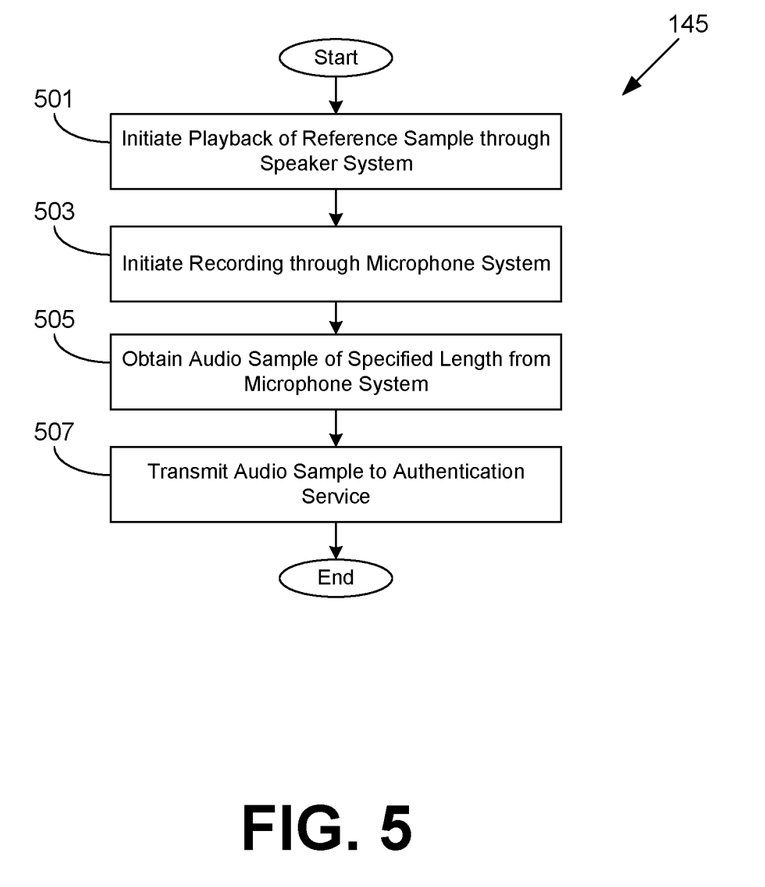
FIG. 5 is a drawing of a flowchart illustrating a method according to examples of the disclosure.

Turning now to FIG. 5, shown is a flowchart that provides one example of the operation of the device ID application 145. Functionality attributed to device ID application 145 can be implemented in a single process or application or in multiple processes or applications. The separation or segmentation of functionality as discussed herein is presented for illustrative purposes only. The process shown in FIG. 5 can be initiated by the device ID service 116 and that causes the device ID application 145 to obtain an audio sample from which a sensor-based identifier can be generated.

At step 501, the device ID application 145 can initiate playback of a reference sample 132 using the speaker system 149 of the client device 106. The reference sample 132 can be a high frequency audio sample that is relatively inaudible to humans. The reference sample 132 can be stored on the client device 106 or obtained from the device ID service 116 or other remote location.

At step 503, the device ID application 145 can initiate recording using the microphone system 147 of the client device 106. The microphone system 147 can record an audio sample that includes the reference sample 132 and ambient noise. The microphone system 147 can record audio at the direction of the device ID application 145 for a specified period of time. The longer the audio sample and the more acoustic feature data that is gathered, the more accurate that a resultant sensor-based identifier is likely to be.

At step 505, the device ID application 145 can obtain an audio sample of a specified length from the microphone system 147. As noted above, the microphone system 147 can record audio at the direction of the device ID application 145 for a specified period of time. Again, the longer the audio sample and the more acoustic feature data that is gathered, the more accurate that a resultant sensor-based identifier is likely to be.

At step 507, the device ID application 145 can transmit the audio sample to the device ID service 116, which can generate the sensor-based identifier on behalf of the device ID application 145. In this scenario, the device ID application 145 can rely upon the device ID service 116 to calculate its sensor-based identifier. In this scenario, it might be important to maintain security of the algorithm used to generate the device identifier or the security of the device identifier itself by avoiding the client device 106 from generating or storing its sensor-based identifier. In other scenarios discussed below, the device ID application 145 can generate its own sensor-based identifier. In some examples, after transmitting the audio sample to the device ID service 116, the device ID service 116 can provide the sensor-based identifier to the client device 106 for storage. In other examples, the device ID service 116 can require an audio sample from the client device 106 each time that the device is authenticated or identified by the device ID service 116. Additionally, the length of the audio sample that is captured by the device ID application 145 can vary. In some examples, the audio sample can be less than a second. In other scenarios, the audio sample can be a few seconds in length. After completing step 507, the process proceeds to completion.

Figure 6:
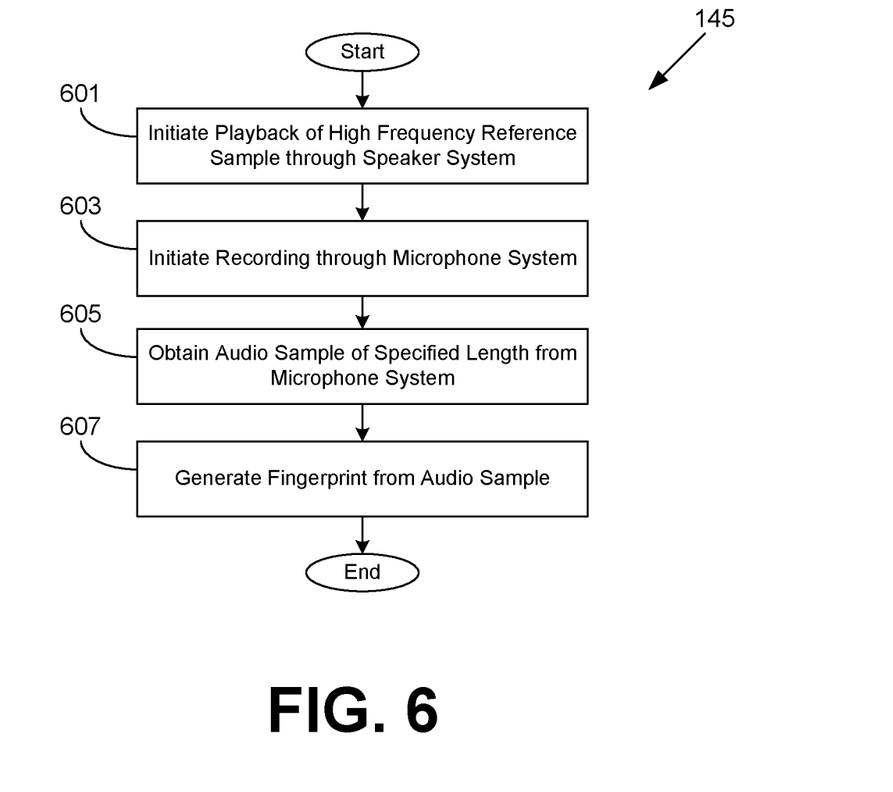
FIG. 6 is a drawing of a flowchart illustrating a method according to examples of the disclosure.

Turning now to FIG. 6, shown is a flowchart that provides one example of the operation of the device ID application 145. Functionality attributed to device ID application 145 can be implemented in a single process or application or in multiple processes or applications. The separation or segmentation of functionality as discussed herein is presented for illustrative purposes only. The process shown in FIG. 6 can be initiated by the device ID service 116 and that causes the device ID application 145 to obtain an audio sample from which a sensor-based identifier can be generated.

The process shown in FIG. 6 illustrates how the device ID application 145 can generate its own sensor-based identifier instead of relying upon the device ID service 116 to do so. At step 601, the device ID application 145 initiate playback of a reference sample 132 using the speaker system 149 of the client device 106. The reference sample 132 can be a high frequency audio sample that is relatively inaudible to humans. The reference sample 132 can be stored on the client device 106 or obtained from the device ID service 116 or other remote location.

At step 603, the device ID application 145 can initiate recording using the microphone system 147 of the client device 106. The microphone system 147 can record an audio sample that includes the reference sample 132 and ambient noise. The microphone system 147 can record audio at the direction of the device ID application 145 for a specified period of time. The longer the audio sample and the more acoustic feature data that is gathered, the more accurate that a resultant sensor-based identifier is likely to be.

At step 605, the device ID application 145 can obtain an audio sample of a specified length from the microphone system 147. As noted above, the microphone system 147 can record audio at the direction of the device ID application 145 for a specified period of time. Again, the longer the audio sample and the more acoustic feature data that is gathered, the more accurate that a resultant sensor-based identifier is likely to be.

At step 607, the device ID application 145 can generate the sensor-based identifier on behalf of the client device 106. In this scenario, the device ID application 145 can generate its own sensor-based identifier instead of relying upon the device ID service 116 to calculate its sensor-based identifier. In some examples, the device ID application 145 can generate the sensor-based identifier and report its identifier to the device ID service 116, which can archive the identifier in the sensor identifier archive 120. After completing step 607, the process proceeds to completion. In the event that that the client device 106 is seeking access to a resource that requires authentication by the device ID service 116, the sensor-based identifier can be provided in conjunction with a request to access a particular resource or a request to authenticate the client device 106.

Figure 7:
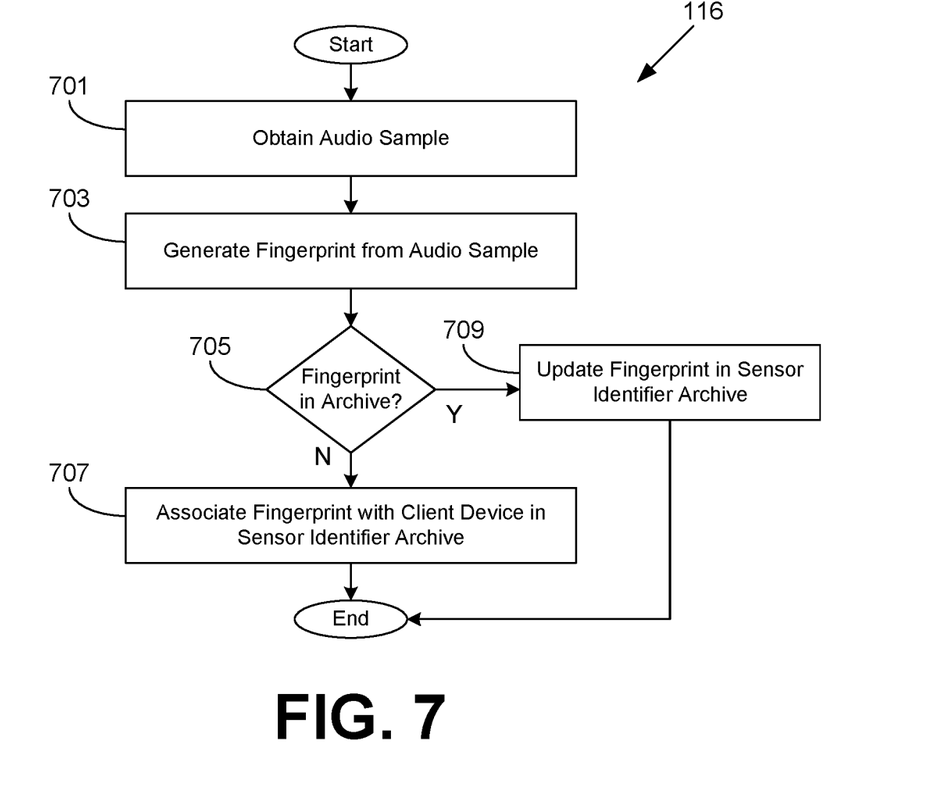
FIG. 7 is a drawing of a flowchart illustrating a method according to examples of the disclosure.

Turning now to FIG. 7, shown is a flowchart that provides one example of the operation of the device ID service 116. Functionality attributed to the device ID service 116 can be implemented in a single process or application or in multiple processes or applications. The separation or segmentation of functionality as discussed herein is presented for illustrative purposes only. The process shown in FIG. 7 illustrates how the device ID service 116 can generate a sensor-based identifier on behalf of a client device 106 and associate the identifier with the client device 106 in the sensor identifier archive 120.

First, at step 701, the device ID service 116 can obtain an audio sample of a specified length from the device ID application 145. As noted above, the microphone system 147 of the client device 106 can record audio at the direction of the device ID application 145 for a specified period of time. The device ID service 116 can specify the length of the audio sample to the device ID application 145. Again, the longer the audio sample and the more acoustic feature data that is gathered, the more accurate that a resultant sensor-based identifier is likely to be. Additionally, in some examples, the audio sample can include a portion that is recorded when playback of the reference sample 132 has ceased so that noise cancellation is facilitated with a portion of the sample that only includes ambient noise.

At step 703, the device ID service 116 can generate the sensor-based identifier based upon the audio sample obtained at step 701. As noted above, the sensor-based identifier can be generated based upon acoustic features that can be extracted from the audio sample. The sensor-based identifier can be generated by creating a fingerprint or alphanumeric identifier from the acoustic feature data that is generated from the audio sample. An algorithm that generates a fingerprint from the acoustic feature data should generate a fingerprint or identifier that is unique with respect to a fingerprint or identifier that is generated from an acoustic feature data set that is generated by or on behalf of another client device 106.

At step 705, the device ID service 116 can determine whether the generated fingerprint is already present in the sensor identifier archive 120. The device ID service 116 can make such a determination by determining whether a fingerprint has already been generated for the acoustic feature data obtained from the audio sample received from the client device 106.

If the fingerprint is not already in the sensor identifier archive 120, the process moves to step 707. At step 707, the sensor ID service 116 can create an entry in the sensor identifier archive 120 and associate the generated fingerprint with the client device 106. The fingerprint becomes the sensor-based identifier. In this way, a sensor-based identifier that uniquely identifies the client device 106 can be associated with the client device 106 and used to subsequently identify or authenticate the client device 106. Thereafter, the process proceeds to completion.

If the fingerprint is already in the sensor identifier archive 120, the process can move from step 705 to step 709. At step 709, the device ID service 116 can update the fingerprint in the sensor identifier archive 120 with the audio sample or acoustic feature data obtained from the audio sample. In this way, the device ID service 116 makes a determination that the audio sample corresponds to a previously generated sensor-based identifier and the acoustic feature data can be used to strengthen the quality of the previously generated sensor-based identifier. The acoustic feature data generated from the audio sample at step 703 can be used as an additional sample that strengthens the quality of the sensor-based identifier. Thereafter, the process proceeds to completion.

Figure 8:
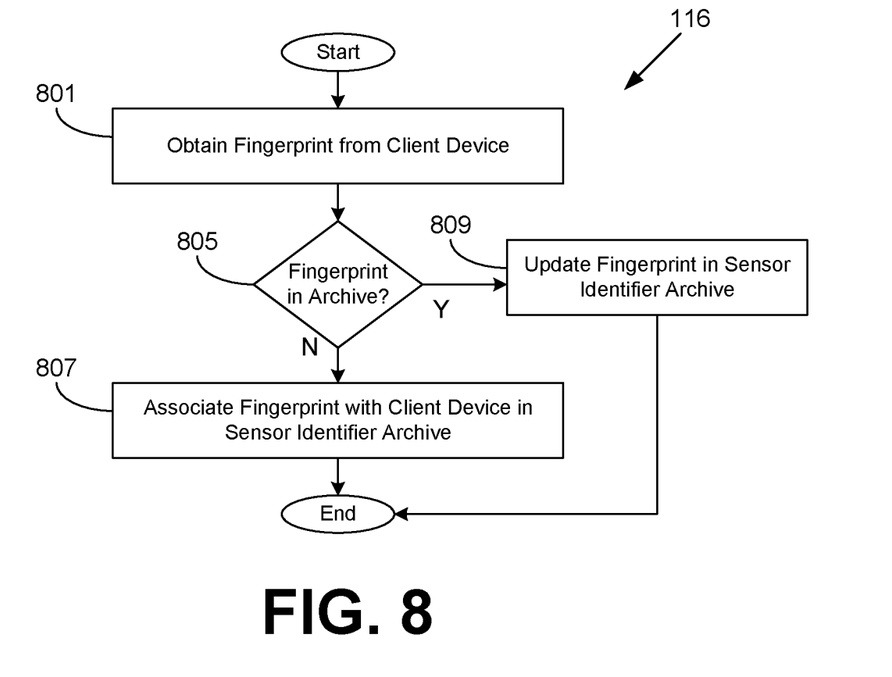
FIG. 8 is a drawing of a flowchart illustrating a method according to examples of the disclosure.

Turning now to FIG. 8, shown is a flowchart that provides one example of the operation of the device ID service 116. Functionality attributed to the device ID service 116 can be implemented in a single process or application or in multiple processes or applications. The separation or segmentation of functionality as discussed herein is presented for illustrative purposes only. The process shown in FIG. 8 illustrates how the device ID service 116 can receive a sensor-based identifier generated by the client device 106 and associate the identifier with the client device 106 in the sensor identifier archive 120.

First, at step 801, the device ID service 116 obtain a sensor-based identifier, or a fingerprint, based upon an audio sample captured by a client device 106. As noted above, the sensor-based identifier can be generated based upon acoustic features that can be extracted from an audio sample captured on the client device 106. The sensor-based identifier can be generated by creating a fingerprint or alphanumeric identifier from the acoustic feature data that is generated from the audio sample. An algorithm that generates a fingerprint from the acoustic feature data should generate a fingerprint or identifier that is unique with respect to a fingerprint or identifier that is generated from an acoustic feature data set that is generated by or on behalf of another client device 106.

At step 805, the device ID service 116 can determine whether the generated fingerprint is already present in the sensor identifier archive 120. The device ID service 116 can make such a determination by determining whether a fingerprint has already been generated for the acoustic feature data obtained from the audio sample received from the client device 106.

If the fingerprint is not already in the sensor identifier archive 120, the process moves to step 807. At step 807, the sensor ID service 116 can create an entry in the sensor identifier archive 120 and associate the generated fingerprint with the client device 106. The fingerprint becomes the sensor-based identifier. In this way, a sensor-based identifier that uniquely identifies the client device 106 can be associated with the client device 106 and used to subsequently identify or authenticate the client device 106. Thereafter, the process proceeds to completion.

If the fingerprint is already in the sensor identifier archive 120, the process can move from step 805 to step 809. At step 809, the device ID service 116 can update the fingerprint in the sensor identifier archive 120 with the audio sample or acoustic feature data obtained from the audio sample. In this way, the device ID service 116 makes a determination that the audio sample corresponds to a previously generated sensor-based identifier and the acoustic feature data can be used to strengthen the quality of the previously generated sensor-based identifier. The acoustic feature data generated from the audio sample can be used as an additional sample that strengthens the quality of the sensor-based identifier. Thereafter, the process proceeds to completion.

Figure 9:
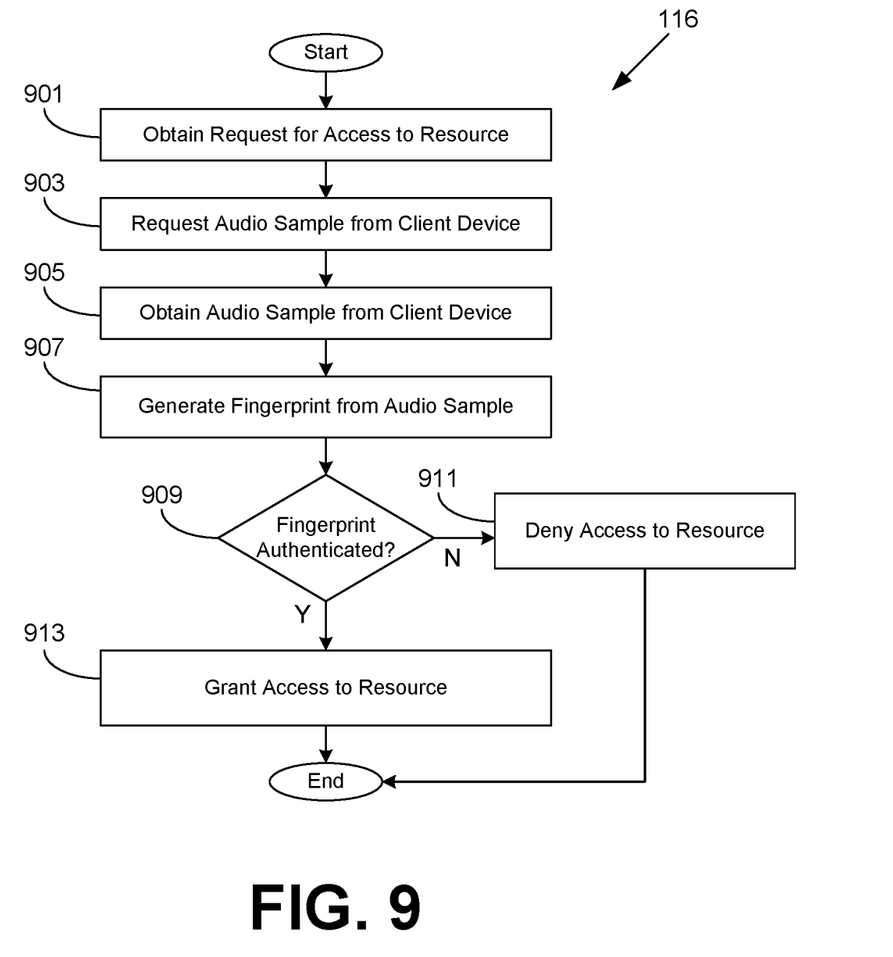
FIG. 9 is a drawing of a flowchart illustrating a method according to examples of the disclosure.

Turning now to FIG. 9, shown is a flowchart that provides one example of the operation of the device ID service 116. Functionality attributed to the device ID service 116 can be implemented in a single process or application or in multiple processes or applications. The separation or segmentation of functionality as discussed herein is presented for illustrative purposes only. The process shown in FIG. 9 illustrates how the device ID service 116 can authenticate or identify a client device 106 based upon a sensor-based identifier.

First, at step 901, the device ID service 116 can obtain a request for access to a resource from or on behalf of a client device 106. The request can be a request to access a secured network resource, a request to enroll the client device 106 with a management service, or any other form of request that requires identification or authentication of the client device 106.

Next, at step 903, the device ID service 116 can request an audio sample from the client device 106. The request for an audio sample can specify a length of the audio sample as well as identify a particular reference sample 122 that should be played to generate the audio sample. In some examples, the length of the audio sample requested to identify or authenticate the client device 106 can be of a different length than the audio sample that is obtained to initially generate a sensor-based identifier for a client device 106. In this sense, the audio sample used to initially generate a sensor-based identifier can be known as a reference audio sample, and other audio samples that are captured for the purpose of authenticating the client device 106 are audio samples. For example, to generate a sensor-based identifier, a longer audio sample can be used than the length of a sample used to identify or authenticate the client device 106.

At step 905, the device ID service 116 can obtain the requested audio sample from the client device 106. The device ID application 145 on the client device can initiate playback of a reference sample 132 and provide the captured audio sample to the device ID service 116.

At step 907, the device ID application 145 can generate a fingerprint or sensor-based identifier from acoustic features that can be extracted from an audio sample captured on the client device 106. A fingerprint or alphanumeric identifier can be generated from the acoustic feature data that is generated from the audio sample. Again, an algorithm that generates a fingerprint from the acoustic feature data should generate a fingerprint or identifier that is unique with respect to a fingerprint or identifier that is generated from an acoustic feature data set that is generated by or on behalf of another client device 106.

At step 909, the device ID application 116 can determine whether the fingerprint generated at step 907 corresponds to an entry in the sensor identifier archive 120. The device ID service 116 can make this determination by determining whether the generated fingerprint matches a fingerprint that corresponds to a sensor-based identifier that was previously generated by stored in the sensor identifier archive 120. In one scenario, due to the natural variability in recorded audio, the device ID application 145 can calculate a confidence score that expresses how closely the fingerprint matches a previously generated fingerprint. If the confidence score meets a confidence score threshold, the device ID application 145 can determine that a match exists. If the confidence score fails to meet the threshold, the device ID application 145 can determine that a match does not exist. Also, in addition to determining whether a match exists, the device ID application 145 can also determine whether there are other permissions associated with the resource that require verification before granting access to the client device.

If at step 909, the device ID service 116 determines that the client device 106 is not authorized to access the resource, access to the resource can be denied at step 911. If at step 909, the device ID service 116 determines that the client device 106 is authorized to access the resource, access to the resource can be denied at step 913. Thereafter, the process proceeds to completion.

The flowcharts of FIGS. 5-9 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing environment 103 and the client devices 106 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the device ID application 145 and/or other components can be stored in one or more storage devices and be executable by one or more processors. Also, a data store can be stored in the one or more storage devices.

The device ID application 145, device ID service 116, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/-10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A system for generating a sensor-based identifier of a client device, comprising:
   at least one computing device; and
   an application executed by the at least one computing device, wherein the application causes the at least one computing device to at least:
      obtain a first request to access a resource from a client device over a network;
      transmit a second request for a sensor-based identifier of the client device to the client device;
      obtain an audio sample from the at least one computing device from the client device, the audio sample generated by playback and recording of a high-frequency reference sample by the client device, the audio sample comprising the high-frequency reference sample and ambient noise, the audio sample further being unique to the client device and based upon a hardware variance of at least one speaker and at least one microphone of the client device relative to other client devices;
      generate the sensor-based identifier of the client device based upon the audio sample, the sensor-based identifier being unique to the client device and based upon the hardware variance of the at least one speaker and the at least one microphone of the client device relative to the other client devices, wherein the sensor-based identifier comprises an alphanumeric identifier generated based on an acoustic feature of the audio sample;
      authenticate the client device based upon the sensor-based identifier and a previously generated sensor-based identifier that is stored in a data store accessible to the at least one computing device, wherein authenticating the client device comprises generating a confidence score based on a comparison between alphanumeric identifier and the previously generated sensor-based identifier; and
      grant the client device access to the resource in an instance in which the confidence score meets a threshold.

2. The system of claim 1, wherein the application generates the previously generated sensor-based identifier by at least:
   causing the client device to initiate the playback of the high-frequency reference sample through a speaker system;
   causing the client device to initiate capture of another audio sample using a microphone system of the client device; and
   wherein the previously generated sensor-based identifier is generated based upon the other audio sample.

3. The system of claim 2, wherein the other audio sample is longer than the audio sample.

4. The system of claim 1, wherein the high-frequency reference sample is ultrasonic.

5. The system of claim 1, wherein the high-frequency reference sample is greater than about 18 kHz.

6. The system of claim 1, wherein the at least one computing device generates the sensor-based identifier by:
   performing a noise suppression algorithm to remove the ambient noise from the audio sample;
   extracting at least one acoustic feature from the audio sample; and
   generating the sensor-based identifier by generating a fingerprint from the at least one acoustic feature.

7. The system of claim 1, wherein the second request for the sensor-based identifier of the client device contains at least one of a reference to the high-frequency reference sample or a copy of the high-frequency reference sample, wherein the high-frequency reference sample is inaudible to a human being.

8. A method comprising:
   obtaining a first request to access a resource from a client device over a network;
   transmitting a second request for a sensor-based identifier of the client device to the client device;
   obtaining an audio sample from a computing device from the client device, the audio sample generated by playback and recording of a high-frequency reference sample by the client device, the audio sample comprising the high-frequency reference sample and ambient noise, the audio sample further being unique to the client device and based upon a hardware variance of at least one speaker and at least one microphone of the client device relative to other client devices;
   generating the sensor-based identifier of the client device based upon the audio sample, the sensor-based identifier being unique to the client device and based upon the hardware variance of the at least one speaker and the at least one microphone of the client device relative to the other client devices, wherein the sensor-based identifier comprises an alphanumeric identifier generated based on an acoustic feature of the audio sample;
   authenticating the client device based upon the sensor-based identifier and a previously generated sensor-based identifier that is stored in a data store accessible to the computing device, wherein authenticating the client device comprises generating a confidence score based on a comparison between the alphanumeric identifier and the previously generated sensor-based identifier; and
   granting the client device access to the resource in an instance in which the confidence score meets a threshold.

9. The method of claim 8, wherein the previously generated sensor-based identifier is generated by at least:
   causing the client device to initiate the playback of the high-frequency reference sample through a speaker system; and
   causing the client device to initiate capture of another audio sample using a microphone system of the client device; wherein
   the previously generated sensor-based identifier is generated based upon the other audio sample.

10. The method of claim 9, wherein the other audio sample is longer than the audio sample.

11. The method of claim 8, wherein the high-frequency reference sample is ultrasonic.

12. The method of claim 8, wherein the high-frequency reference sample is greater than about 18 kHz.

13. The method of claim 8, wherein generating the sensor-based identifier further comprises:
   performing a noise suppression algorithm to remove the ambient noise from the audio sample;
   extracting at least one acoustic feature from the audio sample; and
   generating the sensor-based identifier by generating a fingerprint from the at least one acoustic feature.

14. The method of claim 8, wherein the second request for the sensor-based identifier of the client device contains at least one of a reference to the high-frequency reference sample or a copy of the high-frequency reference sample, wherein the high-frequency reference sample is inaudible to a human being.

15. A non-transitory computer-readable medium embodying a program executable on at least one computing device, wherein the program, when executed, causes the at least one computing device to at least:
   obtain a first request to access a resource from a client device over a network;
   transmit a second request for a sensor-based identifier of the client device to the client device;
   obtain an audio sample from the at least one computing device from the client device, the audio sample generated by playback and recording of a high-frequency reference sample by the client device, the audio sample comprising the high-frequency reference sample and ambient noise, the audio sample further being unique to the client device and based upon a hardware variance of at least one speaker and at least one microphone of the client device relative to other client devices;
   generate the sensor-based identifier of the client device based upon the audio sample, the sensor-based identifier being unique to the client device and based upon the hardware variance of the at least one speaker and the at least one microphone of the client device relative to the other client devices, wherein the sensor-based identifier comprises an alphanumeric identifier generated based on an acoustic feature of the audio sample;
   authenticate the client device based upon the sensor-based identifier and a previously generated sensor-based identifier that is stored in a data store accessible to the at least one computing device, wherein authenticating the client device comprises generating a confidence score based on a comparison between the alphanumeric identifier and the previously generated sensor-based identifier; and
   grant the client device access to the resource in an instance in which the confidence score meets a threshold.

16. The non-transitory computer-readable medium of claim 15, wherein the program causes creation of the previously generated sensor-based identifier by at least:

causing the client device to initiate the playback of the high-frequency reference sample through a speaker system; and causing the client device to initiate capture of another audio sample using a microphone system of the client device; wherein the previously generated sensor-based identifier is generated based upon the other audio sample.

17. The non-transitory computer-readable medium of claim 15, wherein the high-frequency reference sample is greater than about 18 kHz.

18. The non-transitory computer-readable medium of claim 15, wherein the program generates the sensor-based identifier by:

performing a noise suppression algorithm to remove the ambient noise from the audio sample;

extracting at least one acoustic feature from the audio sample; and generating the sensor-based identifier by generating a fingerprint from the at least one acoustic feature.

19. The non-transitory computer-readable medium of claim 15, wherein the second request for the sensor-based identifier of the client device contains at least one of a reference to the high-frequency reference sample or a copy of the high-frequency reference sample, wherein the high-frequency reference sample is inaudible to a human being.

20. The non-transitory computer-readable medium of claim 15, wherein the second request comprises a command to the client device to provide the audio sample with a specified length and to include the high-frequency reference sample which is unique to the client device.

* * * * *